US 11,400,887 B2

(12) United States Patent
Luchner

(10) Patent No.: US 11,400,887 B2
(45) Date of Patent: Aug. 2, 2022

(54) FRUNK DELIVERY SYSTEM FOR VEHICLES

(71) Applicant: Byton North America Corporation, Santa Clara, CA (US)

(72) Inventor: Wolfram Luchner, Marina Del Rey, CA (US)

(73) Assignee: Byton North America Corporation, Santa Clara, CA (US)

( * ) Notice: Subject to any disclaimer, the term of this patent is extended or adjusted under 35 U.S.C. 154(b) by 149 days.

(21) Appl. No.: 16/272,450

(22) Filed: Feb. 11, 2019

(65) Prior Publication Data
US 2020/0254969 A1    Aug. 13, 2020

(51) Int. Cl.
| | |
|---|---|
| *B60R 25/24* | (2013.01) |
| *B62D 25/12* | (2006.01) |
| *B62D 25/10* | (2006.01) |
| *B60Q 1/50* | (2006.01) |
| *B60R 25/01* | (2013.01) |
| *E05B 17/10* | (2006.01) |
| *E05B 81/54* | (2014.01) |
| *G09F 21/04* | (2006.01) |
| *E05F 15/79* | (2015.01) |
| *G06Q 50/28* | (2012.01) |

(Continued)

(52) U.S. Cl.
CPC .............. *B60R 25/24* (2013.01); *B60Q 1/503* (2013.01); *B60R 25/01* (2013.01); *B62D 25/105* (2013.01); *B62D 25/12* (2013.01); *E05B 17/10* (2013.01); *E05B 81/54* (2013.01); *E05F 15/79* (2015.01); *G09F 21/048* (2013.01); *B60R 2325/108* (2013.01); *B60Y 2200/91* (2013.01); *G05D 1/021* (2013.01); *G06K 7/1417* (2013.01); *G06Q 50/28* (2013.01)

(58) Field of Classification Search
CPC ... B60R 25/24; B60R 25/01; B60R 2325/108; B62D 25/12; B62D 25/105; B60Q 1/503; E05B 17/10; E05B 81/54; G09F 21/048; E05F 15/79; G06Q 50/28; B60Y 2200/91; G05D 1/021; G06K 7/1417
USPC ........................................................ 701/49
See application file for complete search history.

(56) References Cited

U.S. PATENT DOCUMENTS

| | | | | |
|---|---|---|---|---|
| 6,335,687 B1 * | 1/2002 | Terashima | ............... | E05B 83/26 340/425.5 |
| 2001/0054952 A1 * | 12/2001 | Desai | ................. | G07C 9/00309 340/5.72 |

(Continued)

FOREIGN PATENT DOCUMENTS

| | | | |
|---|---|---|---|
| CN | 207809223 U | * | 9/2018 |
| EP | 1029740 A2 | * | 8/2000 ............... B60R 5/02 |

*Primary Examiner* — Jonathan M Dager
*Assistant Examiner* — Jean W Charleston
(74) *Attorney, Agent, or Firm* — Womble Bond Dickinson (US) LLP

(57) ABSTRACT

A front trunk (frunk) delivery system is disclosure for a vehicle. For one embodiment, the delivery system includes a vehicle trunk at a front portion of the vehicle. The system includes a vehicle trunk lid covering the vehicle trunk. The system includes a bar code at the vehicle. The bar code is to be captured by a mobile device of a first user to remotely operate the vehicle trunk lid for the vehicle trunk to deliver or retrieve (for returns) a delivery parcel/package. The first user can be a third party delivery operator such as a USPS or an Amazon delivery operator.

43 Claims, 6 Drawing Sheets

(51) Int. Cl.
    *G05D 1/02*           (2020.01)
    *G06K 7/14*           (2006.01)

(56) References Cited

U.S. PATENT DOCUMENTS

| | | | |
|---|---|---|---|
| 2008/0258504 A1* | 10/2008 | Sakane | B60R 5/047 296/193.08 |
| 2010/0077804 A1* | 4/2010 | Takeuchi | E05B 41/00 70/57.1 |
| 2010/0250052 A1* | 9/2010 | Ogino | B60R 1/00 348/148 |
| 2016/0026967 A1* | 1/2016 | Shah | G06Q 10/08 701/28 |
| 2016/0076278 A1* | 3/2016 | Morosawa | E05B 77/18 70/263 |
| 2016/0096508 A1* | 4/2016 | Oz | H04L 67/125 701/36 |
| 2017/0017920 A1* | 1/2017 | Stark | B60R 25/24 |
| 2017/0057430 A1* | 3/2017 | Kim | G09F 9/30 |
| 2017/0072848 A1* | 3/2017 | Salter | G02B 6/0003 |
| 2018/0015905 A1* | 1/2018 | Yorke | B60R 16/03 |
| 2018/0205682 A1* | 7/2018 | O'Brien, V | G06Q 10/0833 |
| 2019/0031146 A1* | 1/2019 | Etonye | B60R 25/01 |
| 2019/0197471 A1* | 6/2019 | Endo | H04L 9/0872 |
| 2019/0233022 A1* | 8/2019 | Biancalana | B62D 35/005 |
| 2020/0130644 A1* | 4/2020 | Heinrich | E05B 81/64 |
| 2020/0269722 A1* | 8/2020 | Aykol | B60L 58/18 |
| 2020/0302436 A1* | 9/2020 | Ilincic | G06Q 20/3829 |
| 2021/0127233 A1* | 4/2021 | Santavicca | G01S 5/0278 |
| 2021/0174624 A1* | 6/2021 | Haci | G07C 9/28 |

\* cited by examiner

FRUNK DELIVERY SYSTEM FOR VEHICLES

FIELD

The disclosed embodiments relate generally to vehicle systems and in particular, but not exclusively, to a front trunk (frunk) delivery system for vehicles.

BACKGROUND

With the popularity of online shopping, dedicated delivery lockers have been established at physical locations. A disadvantage of such means of delivery is that a customer needs to drive or deliver to the locker locations. Moreover, the online service must set up and pay for these physical lockers. Vehicles such as electric and non-electric automobiles have front or rear trunk spaces, yet these trunk spaces are typically opaque and locked. Therefore, only the key holder, e.g. the key fob holder, can access these trunk spaces. Moreover, what is in the trunk is typically not visible unless the trunk is unlocked and opened.

SUMMARY

Embodiments are disclosed for a frunk delivery system for a vehicle. For an embodiment of a first aspect, the delivery system includes a vehicle trunk at a front or rear portion of the vehicle. The system includes a vehicle trunk lid covering the vehicle trunk. The system includes a bar code on the vehicle, where the bar code is to be captured by a mobile device of a user to remotely operate the vehicle trunk lid for the vehicle trunk to deliver a delivery parcel/package or for the same or another user to retrieve a delivery parcel/package from the vehicle trunk.

For one embodiment, remotely operating the vehicle trunk lid includes unlocking a latch of the vehicle trunk lid so the lid can be opened to expose a trunk space for delivery or retrieval of the delivery parcel. For one embodiment, a portion of the vehicle trunk lid is semitransparent or transparent for a second user to see through the vehicle trunk lid to determine if a parcel is held within a space of the vehicle trunk.

For one embodiment, the bar code includes a quick response (QR) bar code and the mobile device includes a camera sensor to capture the QR bar code. For one embodiment, the system further includes a lighting module at the exterior portion of the vehicle near the trunk, where the lighting module is to display a first signal in response to unlocking a latch of the vehicle trunk lid and the lighting module is to display a second signal in response to locking the latch of the vehicle trunk lid.

For one embodiment, the system further includes a display module at the front portion of the vehicle to display a message to a second user. For another embodiment, the display module displays a message when a delivery parcel is held within a space of the vehicle trunk to remind the second user to pick up the delivery parcel. For another embodiment, the display module displays no message if no parcel is held within a space of the vehicle trunk.

For one embodiment, the second user remotely operating the vehicle trunk lid includes a third party delivery operator. For one embodiment, the bar code includes a printed image permanently fixed to the front portion of the vehicle. For one embodiment, the bar code includes a digital image displayed on a display module at the front portion of the vehicle.

For one embodiment, the frunk delivery system further includes a timer module to trigger after a predetermined period of time to automatically close the vehicle trunk lid to lock the latch of the trunk lid. For one embodiment, the vehicle trunk lid is to automatically close to lock the latch of the trunk lid once a parcel is placed in the trunk, a parcel is removed from the trunk, or the vehicle detects no user is in a predetermined proximity of the vehicle.

For an embodiment of a second aspect, a method/system to operate a frunk delivery system of a vehicle by a mobile device is disclosed. The system captures, by the mobile device, an image of a bar code associated with a trunk lid of the vehicle. The system transmits bar code data associated with the captured image to a server. If it is determined by the server the mobile device has permission to operate the trunk lid, the system remotely operates the trunk lid for the vehicle trunk to deliver or to retrieve (e.g., for parcel returns) a delivery parcel.

For an embodiment of a third aspect, a system/method to operate a frunk delivery system of a vehicle is disclosed. The system receives bar code data associated with a captured image of a bar code near a front or a back portion of the vehicle. The system receives a mobile device ID from a mobile device capturing the image. The system validates the bar code data is for a vehicle trunk of the vehicle. The system determines the mobile device has a permission to operate a trunk lid for the vehicle trunk. The system remotely operates the trunk lid to deliver or to retrieve a delivery parcel if it is determined the mobile device has permission.

BRIEF DESCRIPTION OF THE DRAWINGS

The appended drawings illustrate examples and are, therefore, exemplary embodiments and should not be considered to be limiting in scope.

DETAILED DESCRIPTION

A frunk delivery system for vehicles is described in detail below. For one embodiment, a QR code is displayed on a vehicle. Third party delivery personnel can scan the QR code with a mobile device to unlock a front trunk lid of the vehicle. The personnel can then place a delivery parcel or package within the front trunk for the vehicle owner to pick up the delivery or retrieve a package or parcel previously placed in the trunk. For some cases, the parcel or package can be delivered or picked up by other parties who are authorized to access the front trunk of the vehicle. The vehicle can be an electric vehicle and/or can be one of a fleet of vehicles.

Figure 1:
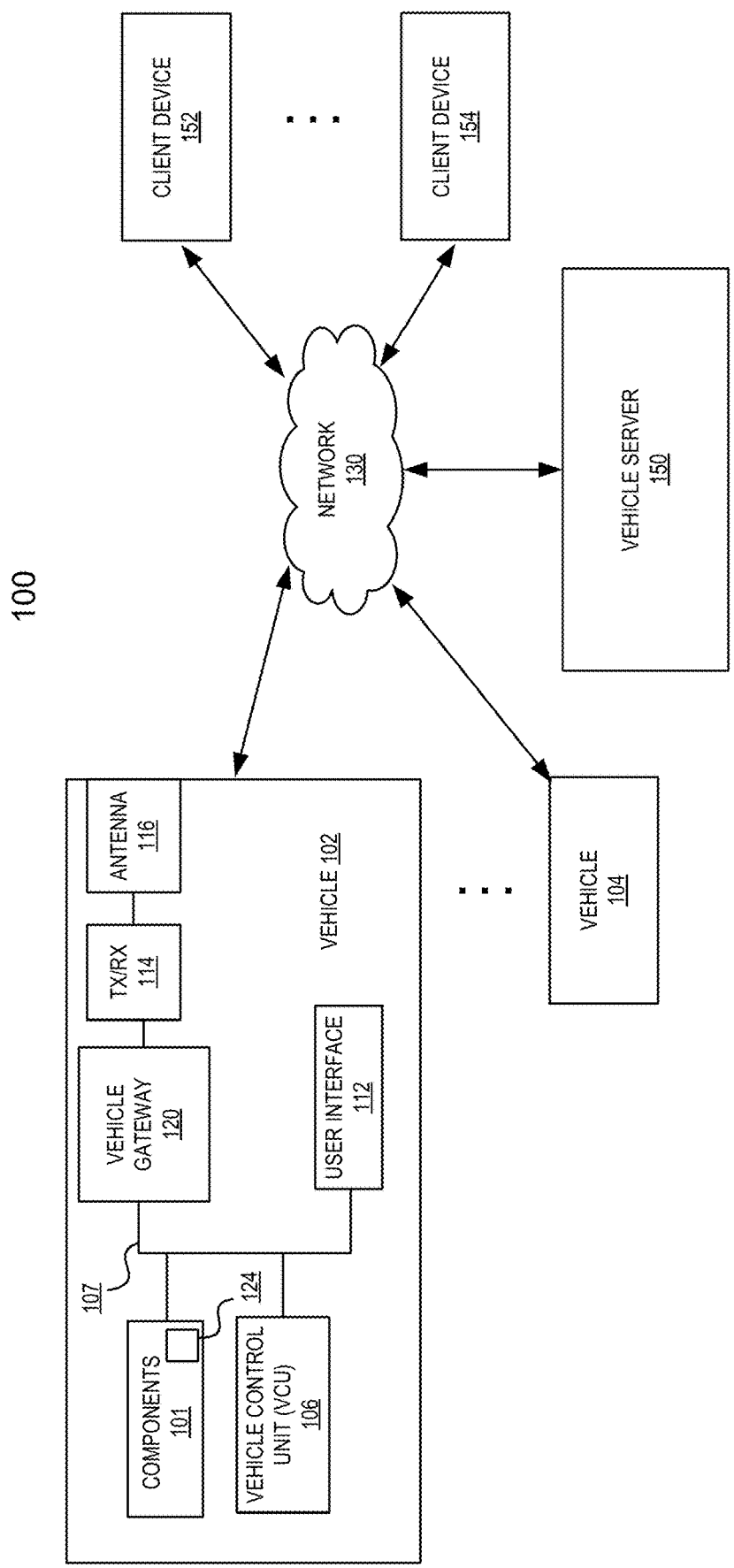
FIG. 1 is a block diagram of an example of a front trunk or frunk delivery system for vehicles according to one embodiment.

FIG. 1 is a block diagram of an example of a frunk or trunk delivery system for vehicles according to one embodiment. Referring to FIG. 1, system 100 includes, but is not limited to, one or more motor vehicles 102-104, one or more client devices 152-154, and vehicle server 150. The motor vehicles 102-104 and client devices 152-154 can communicate with vehicle server 150 over network 130. Client devices 152-154 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 130 may be any type of networks, e.g., wireless network such as a cellular communication network, or a wired network such as a local area network, or a wide area network, or a combination thereof.

For some embodiments, motor vehicle 102 may be a fully electric vehicle, a partially electric (i.e., hybrid) vehicle, or a non-electric vehicle (i.e., vehicle with a traditional internal combustion engine) with a front trunk. Furthermore, although described mostly in the context of automobiles, including sport utility vehicles (SUV), the illustrated systems and methods can also be used in other wheeled vehicles such as trucks, motorcycles, buses, trains, etc. It can also be used in non-wheeled vehicles such as ships and airplanes. In fact, the illustrated embodiments of frunk can apply to any vehicle that has a trunk (front or rear) or a storage compartment which is accessible from an exterior of the vehicle and is physically separate and isolated from the main driver or passenger cabin or driving mechanisms of the vehicle. In other words, frunk/trunk can refer to a front trunk or a rear trunk, interchangeably.

For one embodiment, motor vehicle 102 includes components 101, vehicle control unit (VCU) 106, user interface 112, and vehicle gateway 120. Vehicle control unit (VCU) 106 can be a controller that includes a microprocessor, memory, storage, and a communication interface with which it can communicate with and control various systems such as components 101 and vehicle gateway 120 via network 107. Vehicle gateway 120 can be a security gateway to keep out unauthorized access to network 107. Components 101 may be general components of motor vehicle 102. For example, components 101 can include adjustable seat actuators, power inverters, window controls, electronic braking systems, etc. For one embodiment, components 101 can include frunk locking mechanism 124. Frunk locking mechanism 124 can be communicatively coupled to vehicle control unit (VCU) 106 via communications network 107. Frunk locking mechanism 124 can lock or unlock a latch for a front trunk of motor vehicle 102.

For one embodiment, VCU 106 is the vehicle's main computer, but for other embodiments it can be a component separate from the vehicle's main or primary computer. For one embodiment, vehicle gateway 120 and VCU 106 may be an integrated component. For some embodiments, VCU 106 communicates with the locking mechanism 124 to respectively open or close a latch within locking mechanism 124 to unlock or lock a front trunk of vehicle 102.

Communications network 107 may be a controller area network (CAN) bus, an Ethernet network, a wireless communications network, another type of communications network, or a combination of different communication networks. For one embodiment, vehicle gateway 120 is communicatively coupled to transceiver 114, which is communicatively coupled to antenna 116, through which motor vehicle 102 can wirelessly transmit data to, and receive data from, vehicle server 150. For example, motor vehicle 102 can communicate wirelessly via antenna 116 with a cellular tower, which can then communicate via network 130 (e.g., a cellular communication network, a local area network, a wide area network, etc.) with vehicle server 150. Although only one vehicle server 150 is shown, for other embodiments, vehicle server 150 may be comprised of two or more server computer systems distributed over network 130.

Vehicle server 150 is communicatively coupled to network 130, so that vehicle server 150 can exchange data with motor vehicles 102-104, as well as client devices 152-154. Client devices 152-154 may be mobile devices. For example, vehicle server 150 may provide authorization for client device 152 to unlock a front trunk of motor vehicle 102 when client device 152 scans a QR code of motor vehicle 102. Although illustrated as a single server, for other embodiments, server 150 can include multiple servers, each of which includes one or more microprocessors, memory, and storage.

Figure 2:
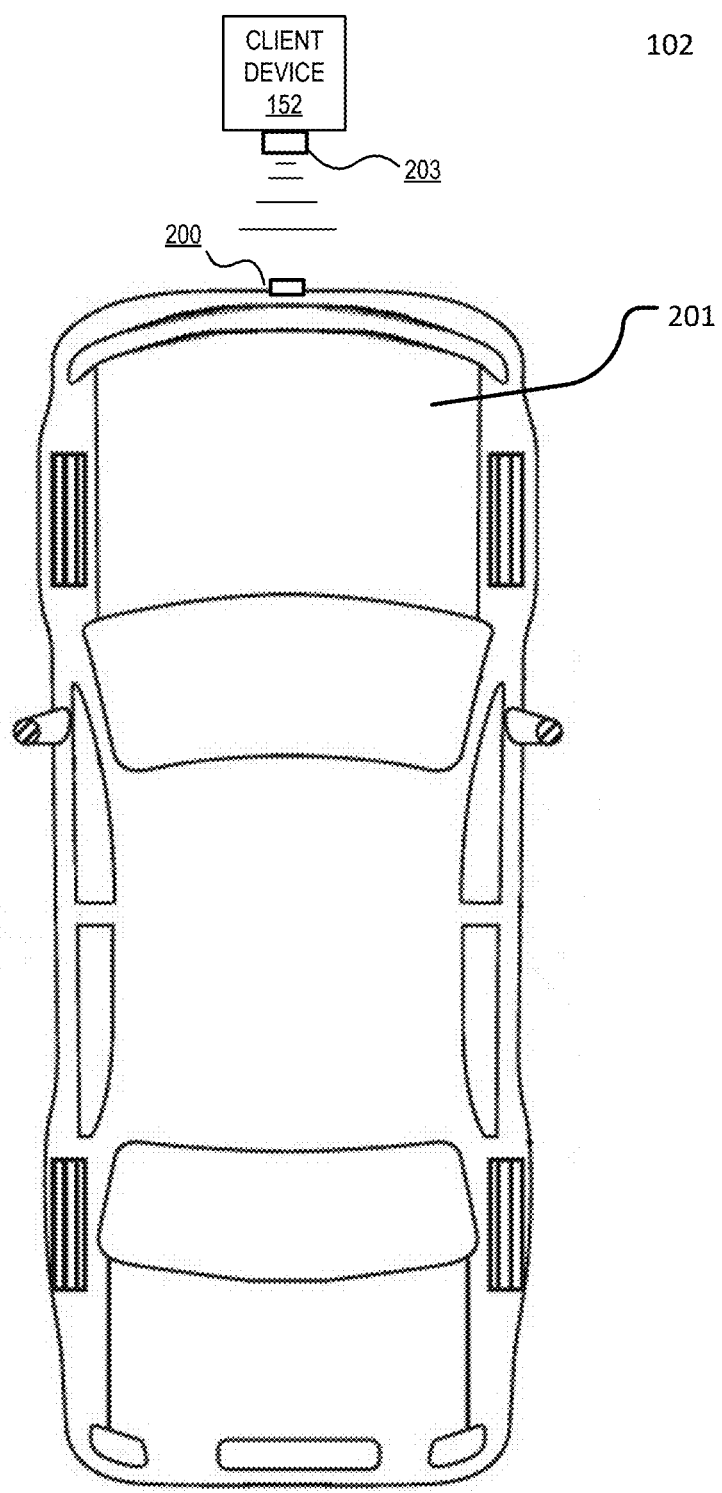
FIG. 2 is a block diagram illustrating a top view of a vehicle according to one embodiment.

FIG. 2 is a block diagram illustrating a top view of a vehicle according to one embodiment. For example, for one embodiment, a user (not shown) operating client device 152 can come in close proximity of vehicle 102 to scan a QR code 200 of vehicle 102. For one embodiment, the scanning is performed using image capturing device 203 of client device 152 to capture an image of QR code 200. Client device 152 then decodes a QR identifier (ID) based on the captured QR code image. Based on the decoded QR ID, client device sends an authorization request to a vehicle server, such as vehicle server 150 of FIG. 1, to request access authorization, e.g., to unlock front trunk 201 of vehicle 102. For one embodiment, the QR ID is a UUID or a random number generated by a random number generator. The QR ID may be generated by vehicle server 150 or vehicle 102. For one embodiment, the user is a third party parcel delivery operator, such as a USPS or Amazon parcel delivery operator.

For one embodiment, upon receiving the authorization request to unlock the front trunk of vehicle 102, by vehicle server 150, server 150 may send an authorization success or authorization denial (e.g., authorization result) to vehicle 102. Vehicle 102 then operates the front trunk locking mechanism of vehicle 102 based on the authorization results. The authorization given to third party delivery operators may be preconfigured by an owner of vehicle 102 or a vehicle fleet owner. Furthermore, the authorization may be set to a predetermined period of time such that the authorization access will expire and/or revoked when the predetermined time period elapses.

In another embodiment, upon receiving the authorization request, by vehicle server 150, server 150 may send an authorization success or authorization denial (e.g., authorization result) back to client device 152. Client device 152 then communicates the authorization result to vehicle 102 for vehicle 102 to operate the front trunk locking mechanism of vehicle 102 based on the authorization results. For some embodiments, client device 152 may communicate with vehicle 102 via a wireless signal such as a WIFI, Bluetooth, or any near field wireless signal.

For one embodiment, the QR ID is encrypted using a cryptographic hashing algorithm (such as AES or RSA, etc.) before the QR ID is communicated over the network. This way, the communication is ensured an integrity and confidentiality of the communication of the QR ID between client device 152 and vehicle server 150. For example, client device 152 may include an application running on client device 152. The application can communicate with server 150 via an API. For one embodiment, the application can generate an asymmetrical cryptography key pair (e.g., public/private key pair) to be associated with client device 152 and publish the public key to server 150. Thereafter, messages from the client device 152 to server 150 can be encrypted using the private key and vehicle server 150 can decrypt the message using a corresponding public key. The message can include a QR ID or an authorization result (e.g., allow or deny) to operate frunk 201 of vehicle 102. In another embodiment, a symmetric cryptography key can be used for communication between server 150 and client device 152.

For one embodiment, server 150 receives an authorization request including a QR ID. Server 150 then queries a database or an authorization mapping table using the QR ID and/or a device identifier of client device 152 to 1) validate the QR ID corresponds to a vehicle trunk such as frunk 201 of vehicle 102, and to 2) determine whether client device 152 is authorized to access frunk 201 of vehicle 102. An example authorization mapping table (stored on server 150) can include a first list of QR IDs for frunks which are registered with vehicle server 150, and a second list which maps QR IDs to client devices by device IDs and/or third party operators (e.g., by operator IDs). Thus, if there is an entry or the entry has an access permission mapping the QR ID 200 to client device 152 (e.g., a device of the third party operator), vehicle server 150 would grant client device 152 the access permission/authorization to unlock front trunk 201 of vehicle 102. Otherwise, vehicle server 150 would deny client device 152 the access authorization to front trunk 201.

For one embodiment, vehicle 102 can capture an image (such as a wide angle image) of the surrounding area when front trunk 201 unlocks so to keep a record of the user accessed the front trunk 201. In another embodiment, front trunk 201 automatically closes/locks once the package is placed in or removed from the trunk, or when the car detects that no one is in the vicinity or near a proximity of front trunk 201, or after a predetermined time period has passed since opening. For one embodiment, the front trunk 201 includes a timer or timer module which can count to the predetermined time period to trigger the front trunk 201 to automatically close.

Figure 3:
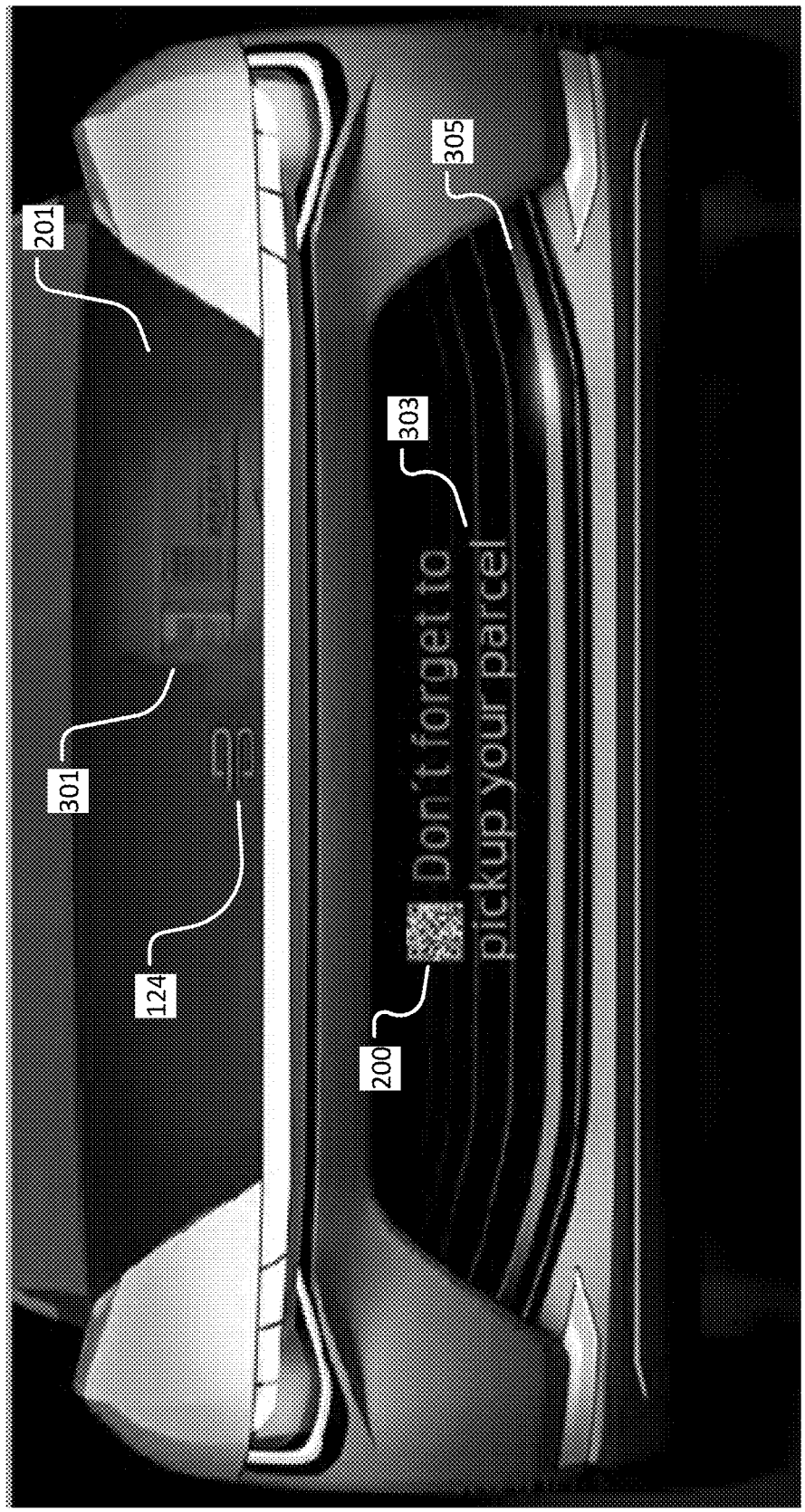
FIG. 3 is a block diagram illustrating a front view of a vehicle according to one embodiment.

FIG. 3 is a block diagram illustrating a front view of a vehicle according to one embodiment. Referring to FIG. 3, for one embodiment, a front portion of vehicle 102 includes front trunk 201, bar code (e.g., QR code) 200, display module 303, and lighting module 305. Front trunk 201 can include a semi-transparent or transparent trunk (e.g., for a user to see through) lid/cover 301, and locking mechanism 124. Locking mechanism 124 can lock or unlock the trunk lid 301. Locking mechanism 124 can be controlled by vehicle 102 or remotely via vehicle server 150 (e.g., through QR code authorization) or remotely via a client device 152. For one embodiment, when trunk lid 301 is locked, front trunk 201 is inaccessible, and when trunk lid 301 is unlocked, front trunk 201 is accessible.

For one embodiment, bar code 200 displays a bar code such as a QR code corresponding to access authorization of vehicle front trunk 201. In another embodiment, bar code can be a digital image displayed on a display module (e.g., display panel). In another embodiment, bar code includes a printed image fixed on a surface of vehicle 102. For some embodiments, the bar code can be at the front of the vehicle or near the front of the vehicle.

For one embodiment, display module 303 displays a message to remind a user of vehicle 102 that there is a delivery parcel held within front trunk 201. For example, the message may be inserted by a third party delivery operator (e.g., via mobile device/client device 152) when the third party delivery operator delivers a delivery parcel. For example, an operator can generate the message to notify a user when is the parcel delivered and/or whom delivered the parcel. Here, the message to be displayed can be any type of messages.

For one embodiment, lighting module 305 can display a first light signal (e.g., a light turns on) in response to a delivery operator obtaining access authorization for front trunk 201 or a user of vehicle 102 unlocks locking mechanism 124 for front trunk 201. Lighting module 305 can display a second light signal (e.g., the light turns off) in response to an authorization denial or when locking mechanism 124 of front trunk 201 is in a locked state. Note that the first and second light signals can, alternatively, be different colored lights, or correspond to different portion/sets of lights of lighting module 305 being activated.

For one embodiment, a customer can arrange with a third party delivery operator so that the third party delivery operator can deliver or retrieve (for the customer to return a parcel) a parcel from the customer's vehicle. For another embodiment, the customer can arrange with the third party delivery operator and a fleet operator so that the third party delivery operator can use a vehicle of the fleet operator to deliver or retrieve parcels for the benefit of the customer. For one embodiment, the fleet of vehicles can be autonomously driven, e.g., there is no driver.

Figure 4:
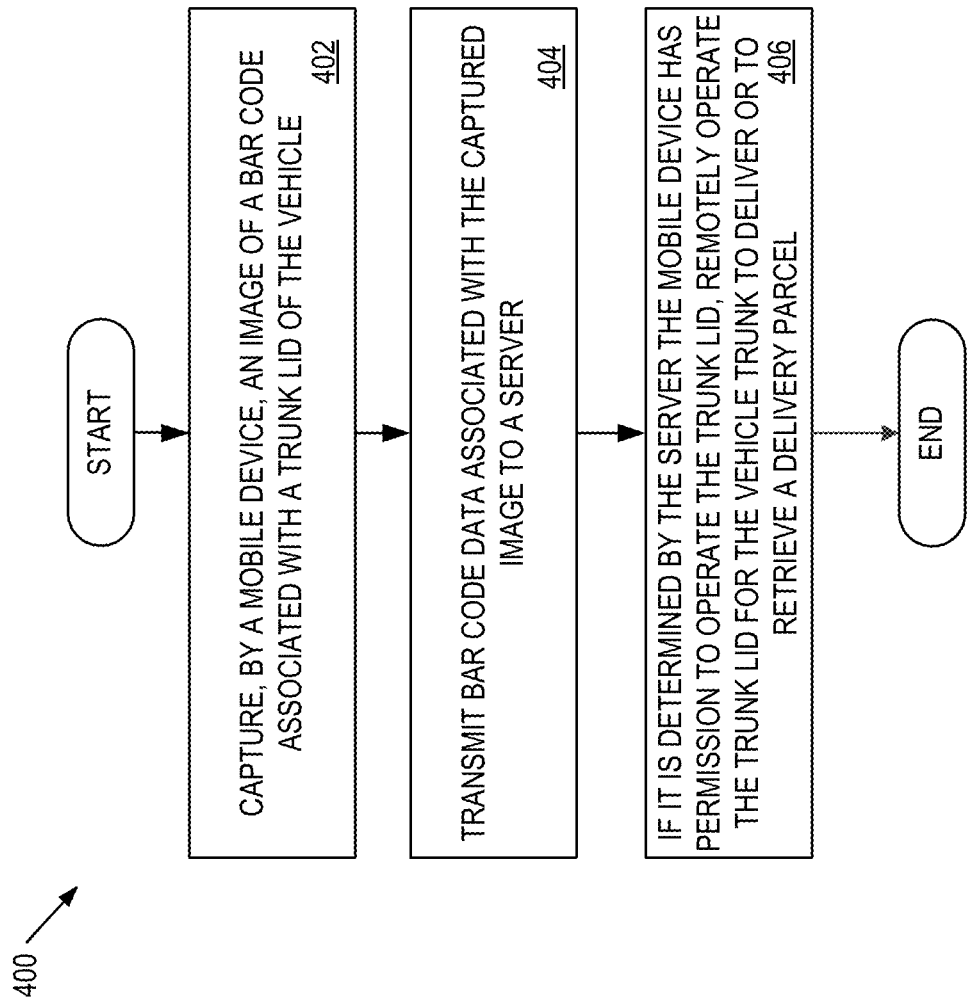
FIG. 4 is a flow diagram illustrating a method according to one embodiment.

FIG. 4 is a flow diagram illustrating a method to operate a frunk delivery system using a mobile device according to one embodiment. Method 400 may be performed by a processing logic that may comprise hardware (circuitry, dedicated logic, etc.), software (such as is run on a general purpose computer system or a dedicated machine), firmware, or a combination. For one embodiment, method 400 is performed by client device 152. Referring to FIG. 4, at block 402, processing logic captures, by the mobile device, an image of a bar code associated with a trunk lid of the vehicle. At block 404, processing logic transmits bar code data associated with the captured image to a server. At block 406, if it is determined by the server the mobile device has a permission to operate the trunk lid, processing logic remotely operates the trunk lid for the vehicle trunk to deliver or to retrieve a delivery parcel.

For one embodiment, processing logic further receives an acknowledgement from the server acknowledging whether the mobile device has permission to operate the trunk lid. For one embodiment, processing logic further decodes the image of the bar code to generate a bar code value, and where transmitting the bar code data includes transmitting the bar code value associated with the captured image to the server. For another embodiment, processing logic further encrypts the bar code value using a cryptographic hashing algorithm and where transmitting bar code data includes transmitting the encrypted bar code value to the server.

For one embodiment, a portion of the trunk lid is semi-transparent or transparent for a user to see through the trunk lid to determine if a parcel is held within a space of the vehicle trunk. For one embodiment, the bar code includes a QR bar code and the mobile device includes a camera sensor to capture the QR bar code.

For one embodiment, the mobile device is operated by a third party delivery operator and an owner of the vehicle is a customer, or a fleet operator, or the third party delivery operator. For one embodiment, the vehicle is an autonomous driving vehicle.

Figure 5:
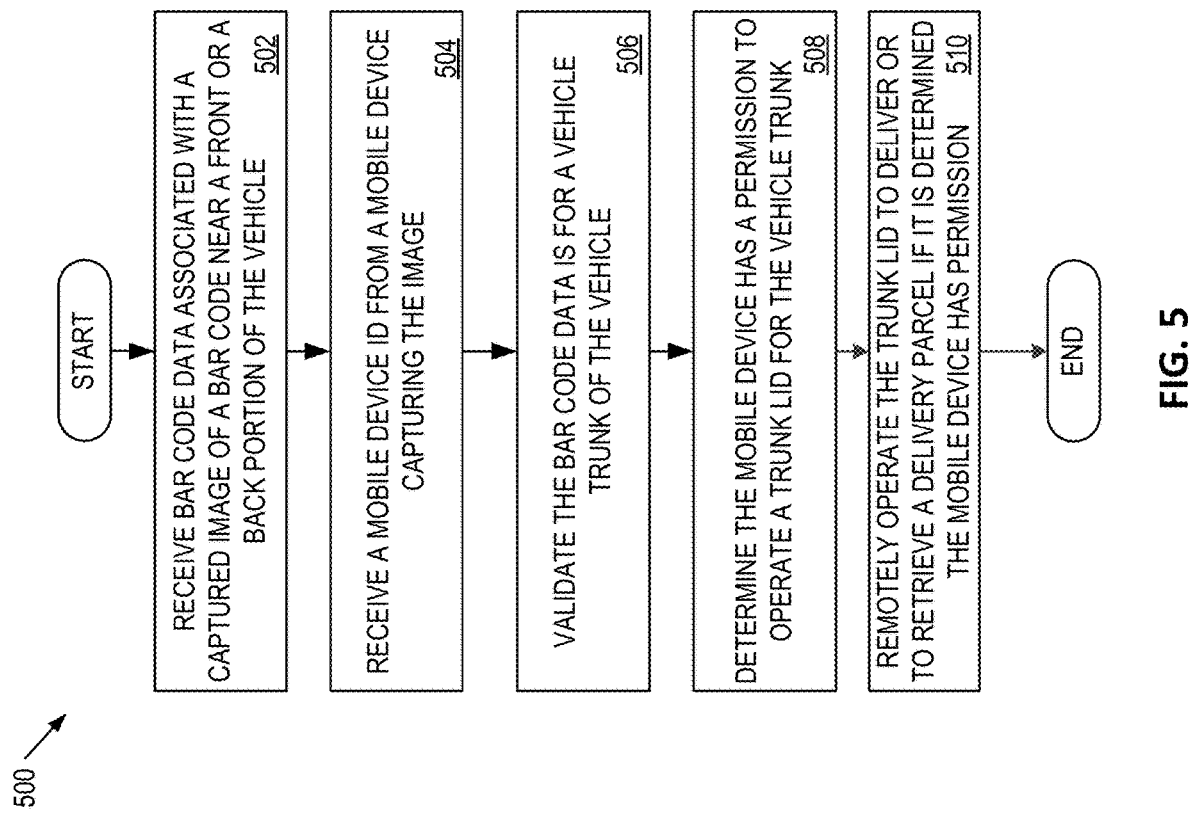
FIG. 5 is a flow diagram illustrating a method according to one embodiment.

FIG. 5 is a flow diagram illustrating a method to operate a frunk delivery system according to one embodiment. Method 500 may be performed by a processing logic that may comprise hardware (circuitry, dedicated logic, etc.), software (such as is run on a general purpose computer system or a dedicated machine), firmware, or a combination. For one embodiment, method 500 is performed by vehicle server 150. Referring to FIG. 5, at block 502, processing logic receives bar code data associated with a captured image of a bar code near a front or a back portion of the vehicle. At block 504, processing logic receives a mobile device ID from a mobile device capturing the image. At block 506, processing logic validates the bar code data is for a vehicle trunk of the vehicle. At block 508, processing logic determines the mobile device has a permission to operate a trunk lid for the vehicle trunk. At block 510, processing logic remotely operates the trunk lid to deliver or to retrieve a delivery parcel if it is determined the mobile device has permission.

For one embodiment, processing logic further transmits a signal to the vehicle to unlock a latch of the trunk lid to open the trunk lid to expose a trunk space for delivery or to retrieval of the delivery parcel, or transmits a signal to the mobile device to direct the mobile device to unlock the latch of the trunk lid to open the trunk lid. For one embodiment, if the bar code data is the captured image, processing logic further decodes the image to generate a bar code value for validation. For one embodiment, if the bar code data is an encrypted bar code value, processing logic further decrypts the encrypted bar code value using a cryptographic hashing algorithm to generate a bar code value for validation.

For one embodiment validating the bar code data includes determining the bar code data is one of a number of entries of a mapping table of the server, where each of the number of entries correspond to one of a number of vehicle trunks. For one embodiment, determining the mobile device has the permission to operate the vehicle trunk lid includes determining the mobile device ID is associated with the validated bar code data using the mapping table of the server.

For one embodiment, a portion of the trunk lid is semi-transparent or transparent for a user to see through the vehicle trunk lid to determine if a parcel is held within a space of the vehicle trunk. For one embodiment, the bar code includes a QR bar code and the mobile device includes a camera sensor to capture the QR bar code. For one embodiment, the mobile device is operated by a delivery operator and an owner of the vehicle is a customer, or a fleet operator, or the delivery operator. For one embodiment, the vehicle is an autonomous driving vehicle.

Figure 6:
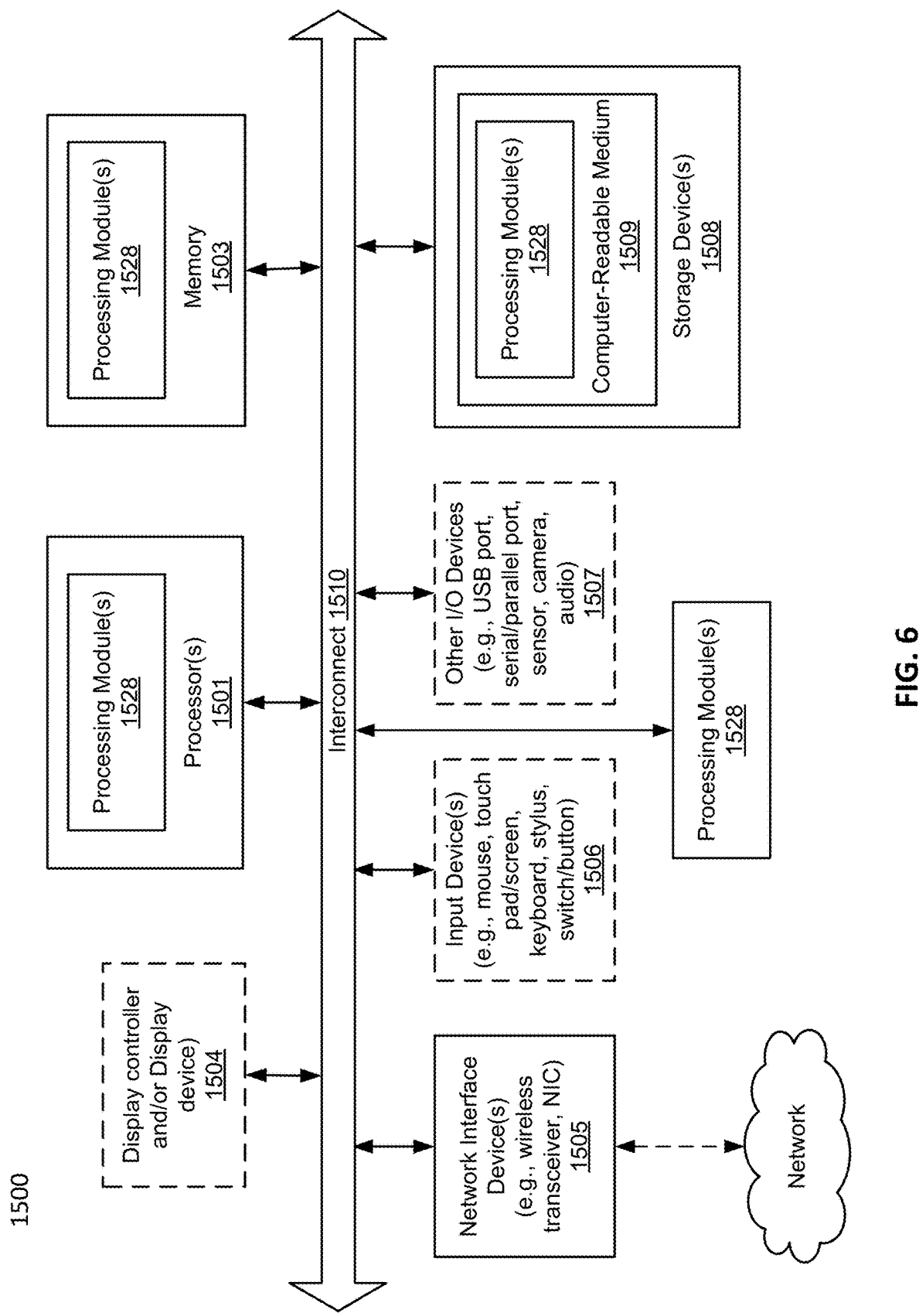
FIG. 6 is a block diagram illustrating a data processing system according to one embodiment.

FIG. 6 is a block diagram illustrating an example of a data processing system which may be used with one embodiment of the invention. For example, system 1500 may represent any of data processing systems described above performing any of the processes or methods described above, such as, for example, a client device or a server described above, such as, for example, vehicles 102-104, server 150, and client devices 152-154 as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur for other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

For one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which for one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However for other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, vehicle server 150, client devices 152-154, vehicle 102-104, VCU 106, and gateway 120 of FIG. 1, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A frunk delivery system for a vehicle, the frunk delivery system comprising:
   a vehicle trunk at a front portion of the vehicle;
   a vehicle trunk lid covering the vehicle trunk; and
   a bar code at a front portion of the vehicle, wherein the bar code is to be captured by a mobile device of a first user to remotely operate the vehicle trunk lid for the vehicle trunk to deliver or retrieve a delivery parcel, wherein the vehicle trunk lid is to automatically close to lock the vehicle trunk lid once the vehicle detects that a parcel is removed from the trunk or no user is in a predetermined proximity of the vehicle, wherein the bar code corresponds to an encrypted bar code value, wherein upon capturing the bar code by the mobile device, the mobile device sends an identifier associated with the mobile device and the corresponding encrypted bar code value as an authorization request to a server based on the captured bar code.

2. The frunk delivery system of claim 1, wherein remotely operating the vehicle trunk lid includes unlocking the vehicle trunk lid so the trunk lid can be opened to expose a trunk space for the delivery or retrieval of the delivery parcel.

3. The frunk delivery system of claim 1, wherein a portion of the vehicle trunk lid is semitransparent or transparent for a second user to see through the vehicle trunk lid to determine if a parcel is held within a space of the vehicle trunk.

4. The frunk delivery system of claim 1, wherein the bar code includes a QR bar code and the mobile device includes a camera sensor to capture the QR bar code.

5. The frunk delivery system of claim 1, further comprising a lighting module near the front portion of the vehicle, wherein the lighting module is to display a first signal in response to unlocking the vehicle trunk lid and the lighting module is to display a second signal in response to locking the vehicle trunk lid.

6. The frunk delivery system of claim 1, further comprising a display module at the front portion of the vehicle to display a message to a second user.

7. The frunk delivery system of claim 6, wherein the display module displays a message when a delivery parcel is held within a space of the vehicle trunk to remind the second user to pick up the delivery parcel.

8. The frunk delivery system of claim 6, wherein the display module displays no message if no parcel is held within a space of the vehicle trunk.

9. The frunk delivery system of claim 1, wherein the user remotely operating the vehicle trunk lid includes a third party delivery operator.

10. The frunk delivery system of claim 1, wherein the bar code includes a printed image permanently fixed to the vehicle.

11. The frunk delivery system of claim 1, wherein the bar code includes a digital image displayed on a display module at the front portion of the vehicle.

12. The frunk delivery system of claim 1, further comprising a timer module to trigger after a predetermined period of time to automatically close the vehicle trunk lid to lock the vehicle trunk lid.

13. The frunk delivery system of claim 1, wherein the vehicle trunk lid is to automatically close to lock the vehicle trunk lid once the vehicle detects a parcel is placed in the trunk.

14. A vehicle comprising a frunk delivery system, the frunk delivery system comprising:
   a vehicle trunk at a front portion of the vehicle;
   a vehicle trunk lid covering the vehicle trunk; and
   a bar code at a front portion of the vehicle, wherein the bar code is captured by a mobile device of a first user to remotely operate the vehicle trunk lid for the vehicle trunk to deliver or retrieve a delivery parcel, wherein the vehicle trunk lid is to automatically close to lock the vehicle trunk lid once the vehicle detects that a parcel is removed from the trunk or no user is in a predetermined proximity of the vehicle, wherein the bar code corresponds to an encrypted bar code value, wherein upon capturing the bar code by the mobile device, the mobile device sends an identifier associated with the mobile device and the corresponding encrypted bar code value as an authorization request to a server based on the captured bar code.

15. The vehicle of claim 14, wherein remotely operating the vehicle trunk lid includes unlocking the vehicle trunk lid so the trunk lid can be opened to expose a trunk space for the delivery or retrieval of the delivery parcel.

16. The vehicle of claim 14, wherein a portion of the vehicle trunk lid is semitransparent or transparent for a second user to see through the vehicle trunk lid to determine if a parcel is held within a space of the vehicle trunk.

17. The vehicle of claim 14, wherein the bar code includes a QR bar code and the mobile device includes a camera sensor to capture the QR bar code.

18. The vehicle of claim 14, further comprising a light near the front portion of the vehicle, wherein the light is turned in response to unlocking the vehicle trunk lid and the light is turned off in response to locking the vehicle trunk lid.

19. The vehicle of claim 14, further comprising a display module at the front portion of the vehicle to display a message to a second user.

20. The vehicle of claim 19, wherein the display module displays a message when a delivery parcel is held within a space of the vehicle trunk to remind the second user to pick up the delivery parcel.

21. The vehicle of claim 14, wherein the vehicle is an electric vehicle.

22. The vehicle of claim 14, wherein the vehicle is one of a fleet of vehicles.

23. The vehicle of claim 14, wherein the frunk delivery system further comprising a timer module to trigger after a predetermined period of time to automatically close the vehicle trunk lid to lock the vehicle trunk lid.

24. The vehicle of claim 14, wherein the vehicle trunk lid is to automatically close to lock the vehicle trunk lid once the vehicle detects a parcel is placed in the trunk.

25. A method to operate a frunk delivery system of a vehicle by a mobile device, the method comprising:
capturing, by the mobile device, an image of a bar code at a front portion of a vehicle associated with a trunk lid of the vehicle;
transmitting bar code data associated with the captured image to a server; and
if it is determined by the server the mobile device has a permission to operate the trunk lid, causing remote operation of the trunk lid to be performed for a vehicle trunk to deliver or to retrieve a delivery parcel, wherein the trunk lid is to automatically close to lock the trunk lid once the vehicle detects that a parcel is removed from the trunk or no user is in a predetermined proximity of the vehicle,
wherein the bar code data corresponds to an encrypted bar code value, wherein transmitting the bar code data further comprise transmitting the encrypted bar code value as an authorization request to the server based on the captured image.

26. The method of claim 25, further comprising receiving an acknowledgement from the server acknowledging whether the mobile device has permission to operate the trunk lid.

27. The method of claim 25, further comprising decoding the image of the bar code to generate a bar code value, and wherein transmitting the bar code data includes transmitting the bar code value associated with the captured image to the server.

28. The method of claim 27, further comprising encrypting the bar code value using a cryptographic hashing algorithm and wherein transmitting bar code data comprises transmitting the encrypted bar code value to the server.

29. The method of claim 25, wherein a portion of the trunk lid is semitransparent or transparent for a user to see through the trunk lid to determine if a parcel is held within a space of the vehicle trunk.

30. The method of claim 25, wherein the bar code includes a QR bar code and the mobile device includes a camera sensor to capture the QR bar code.

31. The method of claim 25, wherein the mobile device is operated by a third party delivery operator and an owner of the vehicle is a customer, or a fleet operator, or the third party delivery operator.

32. The method of claim 25, wherein the vehicle is an autonomous driving vehicle.

33. A method to operate a frunk delivery system of a vehicle, the method comprising:
receiving bar code data associated with a captured image of a bar code near a front portion of the vehicle, wherein the bar code data corresponds to an encrypted bar code value, wherein receiving the bar code data includes receiving the encrypted bar code value that is transmitting by a mobile device;
receiving a mobile device ID from the mobile device capturing the image;
validating the bar code data is for a vehicle trunk of the vehicle;
determining the mobile device has a permission to operate a trunk lid for the vehicle trunk; and
remotely operating the trunk lid to deliver or to retrieve a delivery parcel if it is determined the mobile device has permission, wherein the trunk lid is to automatically close to lock the trunk lid once the vehicle detects that a parcel is removed from the trunk or no user is in a predetermined proximity of the vehicle.

34. The method of claim 33, where remotely operating the trunk lid comprises:
transmitting a signal to the vehicle to unlock the trunk lid to open the trunk lid to expose a trunk space for delivery or to retrieval of the delivery parcel; or
transmitting a signal to the mobile device to direct the mobile device to unlock the trunk lid to open the trunk lid.

35. The method of claim 33, further comprising if the bar code data is the captured image, decoding the image to generate a bar code value for validation.

36. The method of claim 33, further comprising if the bar code data is an encrypted bar code value, decrypting the encrypted bar code value using a cryptographic hashing algorithm to generate a bar code value for validation.

37. The method of claim 33, wherein validating the bar code data comprises determining the bar code data is one of a plurality of entries of a mapping table of a server, wherein each of the plurality of entries correspond to one of a plurality of vehicle trunks.

38. The method of claim 37, wherein determining the mobile device has the permission to operate the trunk lid comprises determining the mobile device ID is associated with one of the plurality of entries of the mapping table of the server.

39. The method of claim 33, wherein a portion of the trunk lid is semitransparent or transparent for a user to see through the trunk lid to determine if a parcel is held within a space of the vehicle trunk.

40. The method of claim 33, wherein the bar code includes a QR bar code and the mobile device includes a camera sensor to capture the QR bar code.

41. The method of claim 33, wherein the mobile device is operated by a delivery operator and an owner of the vehicle is a customer, or a fleet operator, or the delivery operator.

42. The method of claim 33, wherein the vehicle is an autonomous driving vehicle.

43. A frunk delivery system for a vehicle, the frunk delivery system comprising:
a vehicle trunk at a front portion of the vehicle;
a vehicle trunk lid covering the vehicle trunk; and
a machine-readable code on the vehicle, wherein the machine-readable code is to be captured by a mobile device of a first user to remotely operate the vehicle trunk lid for the vehicle trunk to deliver or retrieve a delivery parcel, wherein the vehicle trunk lid is to automatically close to lock the vehicle trunk lid once the vehicle detects that a parcel is removed from the trunk or no user is in a predetermined proximity of the vehicle, wherein the machine-readable code corresponds to an encrypted bar code value, wherein upon capturing the machine-readable code by the mobile device, the mobile device sends an identifier associated with the mobile device and the corresponding encrypted bar code value as an authorization request to a server based on the captured machine-readable code.

* * * * *